Aug. 30, 1927.   1,641,119
J. COOK
DECORTICATING APPARATUS FOR THE TREATMENT OF SISAL AND
OTHER FIBROUS LEAVES AND STALKS
Filed March 21, 1925   5 Sheets-Sheet 1

Inventor
J. Cook,
by
atty.

Fig. 4.

Aug. 30, 1927.    1,641,119
J. COOK
DECORTICATING APPARATUS FOR THE TREATMENT OF SISAL AND
OTHER FIBROUS LEAVES AND STALKS
Filed March 21, 1925    5 Sheets-Sheet 5
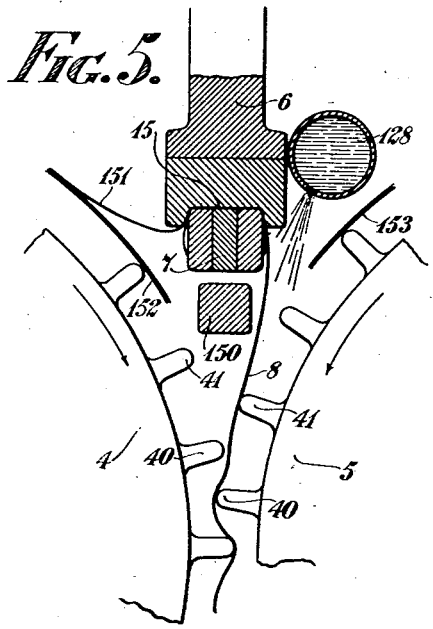
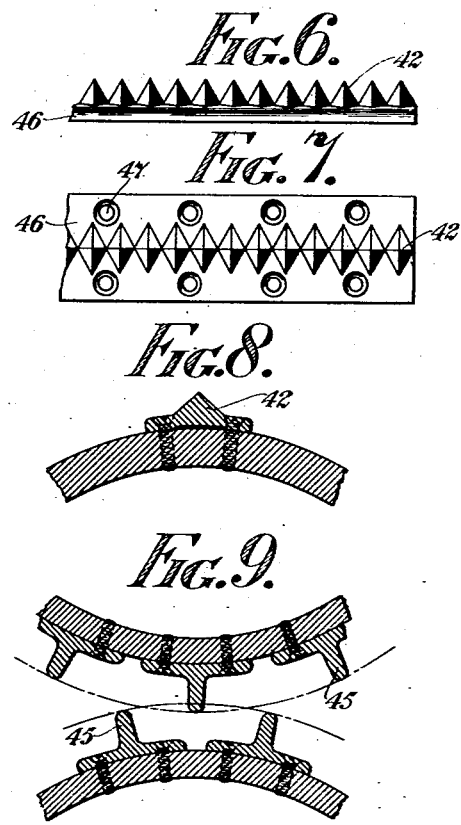
Inventor:
J. Cook,
by
Atty.

Patented Aug. 30, 1927.

1,641,119

UNITED STATES PATENT OFFICE.

JOHN COOK, OF NAIROBI, EAST AFRICA.

DECORTICATING APPARATUS FOR THE TREATMENT OF SISAL AND OTHER FIBROUS LEAVES AND STALKS.

Application filed March 21, 1925, Serial No. 17,366, and in Great Britain November 4, 1924.

This invention relates to a method of and apparatus for use in decorticating fibrous material such as sisal, hemp, jute, ramie, rhea, cocoanut fibre, esparto grass and other fibrous material, including leaves and stalks, and has for its object to provide an apparatus of improved and simplified construction whereby clean, straight fibre may be obtained with a minimum loss due to waste, and with much greater economy than with decorticating apparatus heretofore provided. Other objects of the invention are to provide apparatus which will be capable of treating leaves varying in length and thickness within very wide limits; to reduce the mechanical effort required to drive the apparatus; and to effect a considerable saving in water, labour and floor space. A further object is the provision of a decorticating apparatus of compact design giving easy access to all the bearings, and which can be run without the use of excessively fast belt speeds.

According to the present invention the method consists in subjecting the material to a plurality of shredding and scutching actions, each shredding action being followed by a scutching action. In passing through the apparatus a part of the said material is subjected to a shredding action followed by a scutching action thereon, the remaining part of the material being subsequently subjected to a shredding action followed by a scutching action on the same part, the opposed ends of the material being thereafter subjected to streams of air under pressure and acting thereon in opposite directions in order to lay the fibres flat for delivery from the apparatus. The residue of the material after the first scutching action has been completed is subjected to a blowing or guiding action in order to lay the shredded and scutched fibres in a more or less horizontal direction. During the passage of the material through the apparatus the butt ends of the said material are caused to assume a vertical position by subjecting a part of the material at a suitable distance from the butt ends thereof to a crushing or bruising action. The remaining part of the leaf on the other side of the crushed or bruised portion remains approximately horizontal by the action of a guiding support and by virtue of the inherent stiffness of the material itself during the time the butt ends are being shredded and scutched. After the butt ends have been shredded and scutched and subsequently raised by suitable means to a horizontal position, the remaining part of the leaf is subjected to shredding and scutching and the fibres which, after the complete shredding and scutching of the whole of the leaf naturally assume a vertical position, are raised to an approximately horizontal or flat position by opposed streams of air acting on the ends of the material and/or by suitable guiding means acting on the said ends. In this position, that is to say, in the flat or approximately horizontal position, the fibers are discharged from the apparatus. During the passage of the material, however, through the apparatus water is preferably fed thereto so as to maintain the shredding and scutching rollers in a clean condition and also to assist the removal of the pulp and impurities from below the apparatus. To remove the water from the fibre it is preferred that a compression apparatus be incorporated with the apparatus at the discharge end thereof so that when the material is delivered or discharged from the end of the apparatus it passes to and between rollers forming a part of the compression apparatus so that the water is expressed from the material and delivered therefrom in an approximately dry condition. If desired the compression rollers or either of them may be heated in order to facilitate the drying of the material during the passage thereof through the compression rollers.

In order that the invention may be clearly understood and readily carried into effect, reference is made to the accompanying drawings which show by way of example, a construction in accordance with the present invention.

Figure 4:
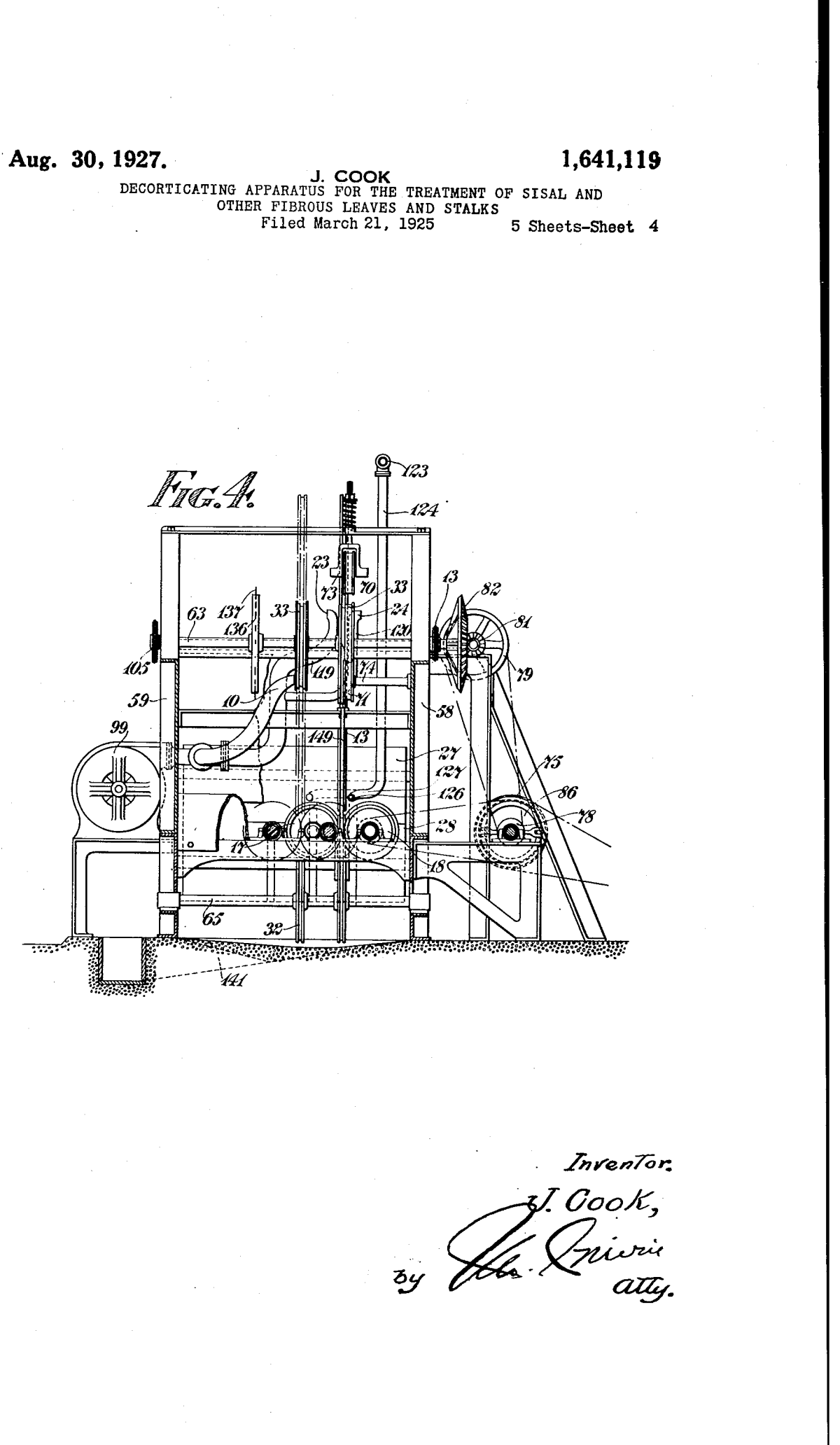

Figure 4 is a cross section on the line 4—4, Figure 2 looking in the direction of the arrows.

Figure 5 is a diagrammatic sectional view showing how the material is held during the shredding and scutching actions.

Figure 6 is an elevation of the type of teeth it is preferred to use on the shredding rollers, and Figure 7 is a plan view thereof.

Figure 8 is a cross section through one of the teeth shown in Figure 6.

Figure 9 shows two co-operating scutching rollers in section.

Figure 1:
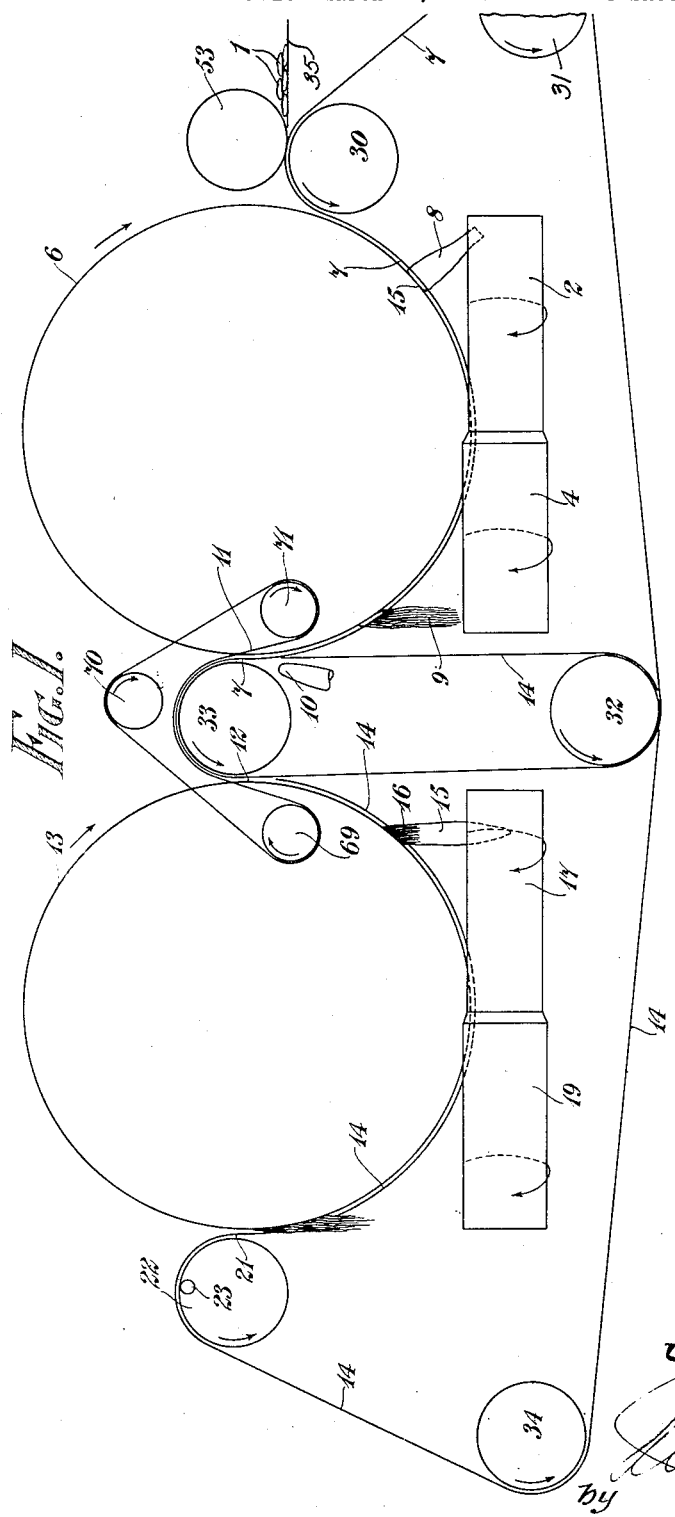
Figure 1 is a diagrammatic illustration intended to show the path of the material through the apparatus. This figure is also intended to show the direction of rotation of the several rollers and wheels and the paths of the chains which co-operate with the rollers and wheels to effect shredding and scutching as well as conveyance of the material through the apparatus.
Figure 2:
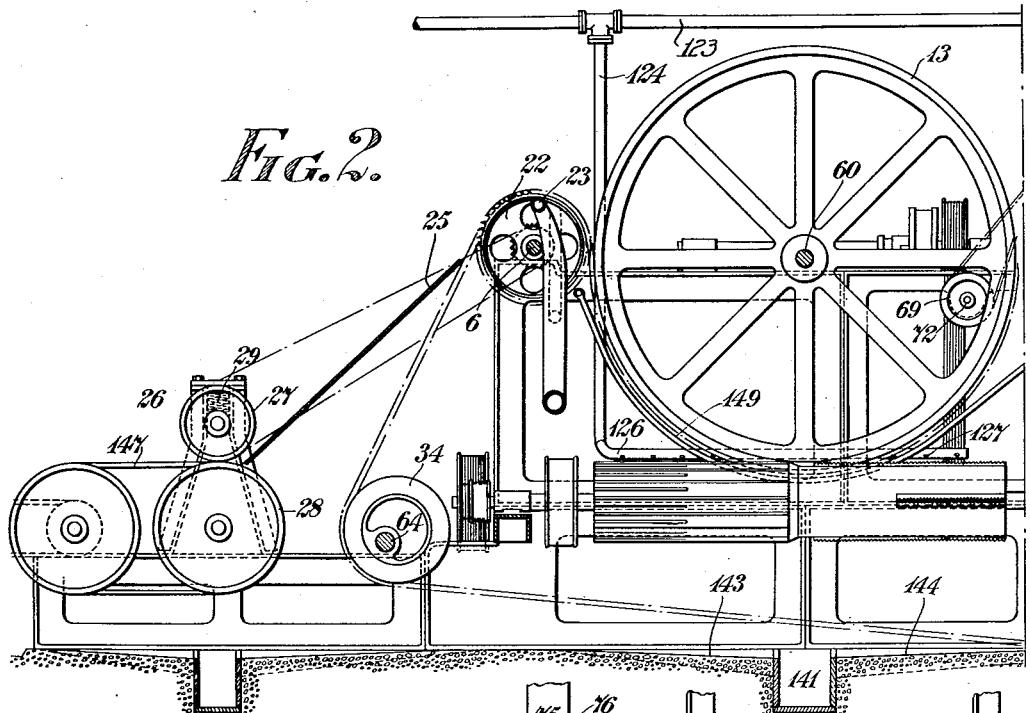
Figure 2 is a sectional elevation on the line 2—2 Figure 3 looking in the direction of the arrows.
Figure 3:
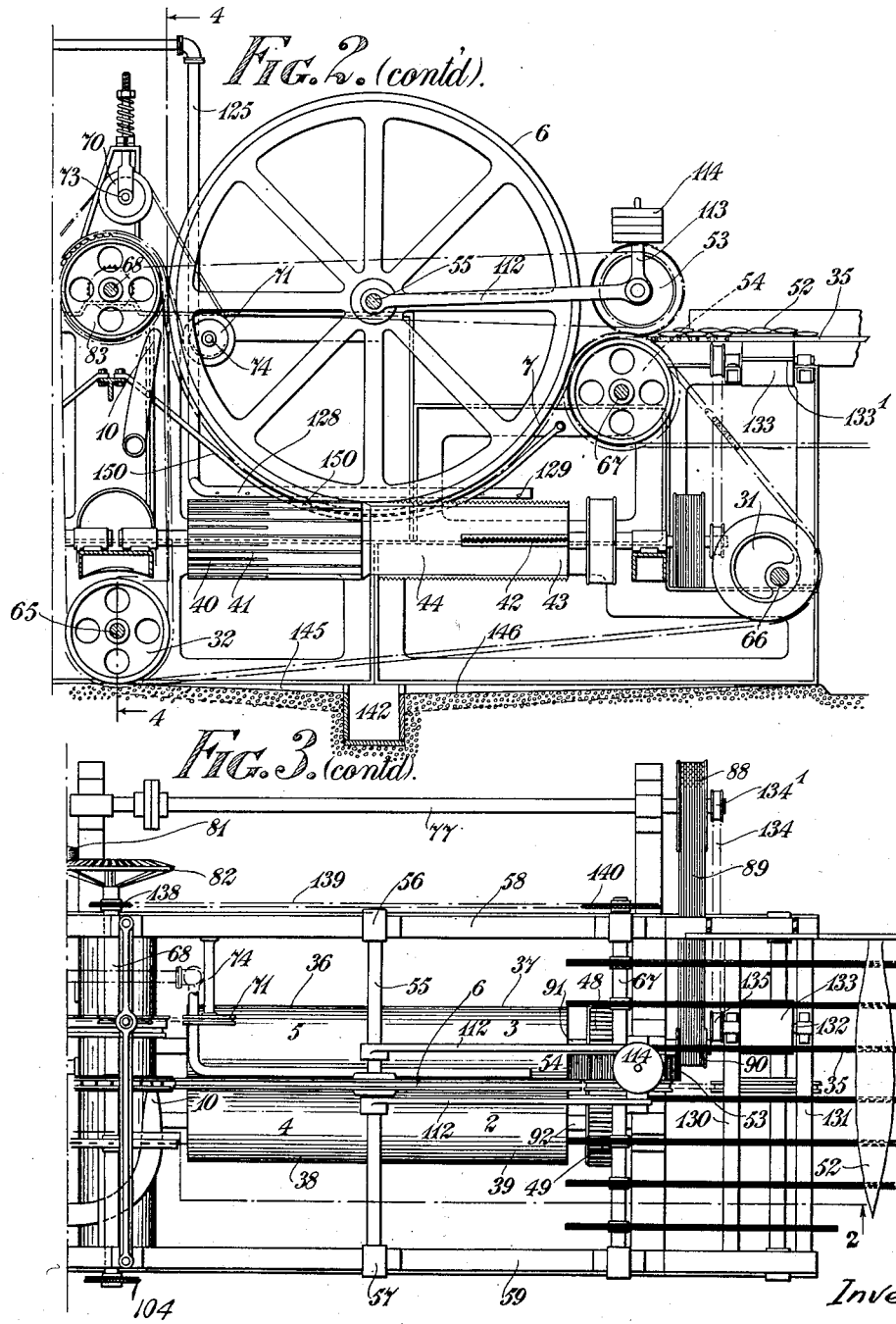
Figure 3 is a plan view of Figure 1.

Referring first to Figure 1, 1 is the material to be treated; 2 and 3 are the shredding rollers of which only one, namely 2, is shown in Figure 1, the two rollers, however, being clearly shown in Figure 3. 4 and 5 are the first scutching rollers, only one of which is shown in Figure 1, both rollers being clearly shown in Figure 3. 6 is a wheel between which and a chain 7 the material 1 is retained during the shredding and scutching actions (see Figure 5). The non-shredded butt end of the leaf is shown at 8 in Figure 1 and the shredded and scutched end of the leaf is shown at 9, Figure 1. 10 indicates the outlet for an air blast to raise the shredded and scutched end 9 of the leaf into an approximately horizontal position to be engaged between the chains 7 and 11 which convey the partly shredded and scutched material to a position 12 to be engaged between a wheel 13 and a chain 14. The material as engaged between the wheel 13 and the chain 14 is shown at 15, 16 showing a part of the leaf which was shredded and scutched during the previous action, that is to say, during the passage of the leaf between the rollers 2, 3 and 4, 5 when held between the wheel 6 and the chain 7. As the leaf is conveyed by the rotational movement of the wheel and the movement of the chain, it is subjected to a shredding action by the rollers 17 and 18 only one of which is shown in Figure 1, both rollers, however, being clearly shown in Figure 3. After shredding the leaf passes to and between scutching rollers 19 and 20 only one of which is shown in Figure 1, both rollers being clearly shown in Figure 3. After this second scutching the leaf is conveyed by the wheel 13 and chain 14 to a position at or near 21, Figure 1, in which position the leaf is engaged by a spiked or toothed pulley wheel 22 so as to facilitate removal of the material from the apparatus. At or about the position 21, Figure 1, both ends of the material hang down and in order to lay these in an approximately horizontal or straight position for delivery from the apparatus the opposite ends of the material are subjected to streams of air from the nozzles 23, 24 one, 23, of which is shown in Figure 1, both nozzles being clearly shown in Figure 3. The shredded, scutched and straightened fibres are discharged from the apparatus onto a guide board 25 from which they pass to a compression apparatus 26. This latter apparatus, however, is optional and need only be used if so desired. It comprises a spring-pressed roller 27 and a co-operating roller 28, the pressure of the spring 29 acting on the shaft of the roller 27 being adjustable as required. The chain 7 is guided by pulleys 30, 31, 32 and 33 and the chain 14 is guided by the toothed wheel 22, a pulley 34 and the pulleys 32 and 33. As shown in Figure 2 the pulleys 31 and 34 are eccentric pulleys so that the tension on the chains can be adjusted to suit the requirements of the apparatus. 35 indicates the feed chains, Figure 1.

Figure 5 which is a diagrammatic section of the two scutching rollers 4 and 5 shows how the material is held whilst being scutched. On reference to this figure it will be seen that the material is retained between a wheel 6 as at 15, the butt end 8 of the material hanging down between the scutching rollers 4 and 5. The other end of the material is supported as at 151 by its own inherent stiffness and by a guard plate 152 which also acts to guide the material in its passage longitudinally of the rollers 4 and 5. The roller 5 is also provided with a guard plate indicated at 153. The rollers 17, 19 and 18, 20 are likewise provided with guard plates, the guard plate over the rollers 18 and 20 also acting to support the shredded and scutched butt end during its passages longitudinally of the shedding and scutching rollers 17, 18, 19 and 20 and whilst the pointed end of the leaf is being shredded and scutched.

Referring more particularly now to Figures 2 and 3, the shredding rollers 2 and 3, the scutching rollers 4 and 5, the shredding rollers 17 and 18 and the scutching rollers 19, 20 are arranged in two sets or pairs slightly spaced apart horizontally between which the material is treated. The two sets or pairs of shredding and scutching rollers are arranged to treat the material in series, the butt ends of the material being treated between the rollers 2, 3 and 4, 5 and the opposite ends of the material being treated between the rollers 17, 18 and 19, 20. The material thus passes through one set or pair of rollers and then through the other set. It will be seen from Figure 3 that the axes of the scutching rollers 4, 5 are aligned with the axes of the shredding rollers 2, 3. Likewise the axes of the scutching rollers 19, 20 are aligned with the axes of the shredding rollers 17, 18. The rollers 2, 3 and 4, 5 which may form one uniform whole are each preferably divided into two portions indicated at 36, 37, 38, 39. The parts 36 and 38 are also sub-divided into two parts, one part having two sets of teeth 40, 41 the latter teeth continuing along the entire surface of the parts 36 and 38 of the rollers 4 and 5. The teeth 40, 41 are longitudinally arranged on the peripheral surface of the rollers 4 and 5 and the left hand part of each scutching roller is provided with double the number of teeth contained on the right hand part of the scutching roller. In Figure 2 the teeth on the left hand half of each scutching roller are indicated by the reference numerals 40, 41 whilst the teeth on the right hand half of the scutching roller are indicated by the numeral 41. The scutching rollers 19, 20 are provided with teeth in a similar manner to the teeth on the scutching rollers 4 and 5. Conveniently, each shredding roller 2, 3 may be divided into two portions, one half being studded with, for example, diamond shaped teeth 42 arranged or disposed in rows parallel to the axis of the roller. The teeth 42 are arranged in rows the number of rows on the part 43 of the roller being double the number of rows of teeth on the other half 44 of the shredding roller. The diamond shaped teeth 42 interengage with the corresponding teeth on the co-operating shredding roller 3, whereas the teeth 40, 41 on the scutching rollers 4, 5 and 19, 20 are staggered relative to each other so as to effect rapid beating of the material during its passage between the respective rollers. The teeth on the scutching rollers may be obtained by fluting the rollers or the said teeth may be rigidly attached in the form of longitudinal T-bars 45 as shown in Figure 9. The diamond shaped teeth 42 are shown in elevation in Figure 6, in plan in Figure 7 and in section in Figure 8 and are cast with a bar 46 which may be secured to the periphery of the respective shredding roller by screws 47 or other suitable means. The diamond shaped, pyramidal, polygonal or other suitably shaped teeth are preferably made of phosphor bronze so as to avoid corrosion of the teeth due to the action of any acid or acids contained in the material being treated. The teeth 40, 41 of the scutching rollers are also preferably made of phosphor bronze for the same reason. The rollers 2, 3, 4 and 5 are geared together as shown at 48, 49, Figure 3 and the rollers 17, 18, 19, 20 are geared together as at 50, 51. It will thus be seen that the rollers are geared together and are arranged in the apparatus in pairs with their axes parallel to each other and in the same horizontal plane, one set or pair of rollers being offset relatively to the other pair. The material to be treated is fed by hand or automatically onto the chains 35, one of the leaves being shown at 52 in Figure 3. The chains 35 feed the material to and beneath fluted crushing rollers 53, 54, the speed of the chain 7 being greater than the speed of the chain 35 so that the leaves are separated from each other as they leave the crushing rollers and thus prevent blocking or piling of the leaves on each other, thereby allowing of the individual treatment of each leaf. After the material 52 leaves the crushing rollers the butt ends of the material, as hereinbefore described, are treated between the shredding rollers 2, 3 whilst retained in position between the wheel 6 and the chain 7. The wheel 6 is mounted on a shaft 55 mounted in suitable bearings 56, 57 secured to side standards or uprights 58, 59. The wheel 13 is mounted on a shaft 60 supported in bearings 61, 62 secured to the side standards or uprights 58, 59. The wheels 22, 34, 32, 31, 30 and 33 are mounted on shafts 63, 64, 65, 66, 67 and 68 respectively and the chain 11 is carried by pulleys 69, 70, 71 which are mounted on shafts 72, 73 and 74 respectively. All these shafts are suitably supported in bearings carried by the uprights or standards 58, 59. The apparatus is driven by a belt 75 from any suitable prime mover or if desired from an overhead line of shafting. The belt 75 runs on a pulley 76 mounted on a shaft 77 having a chain wheel 78 which engages a chain wheel 79 mounted on a shaft 80 and having at its end a bevel pinion wheel 81 which engages the bevel gear wheel 82. The gear wheel 82 is mounted on the shaft 68 and on the same shaft is mounted a sprocket or chain wheel 83 having side flanges 84, 85 provided with spikes or inclined teeth or equivalent so as to assist in transferring the material from between the wheel 6 and chain 7 to engagement between the chains 11 and 14. 86 is a clutch between the pulley 76 and the shaft 77 which is provided with a pulley 87, 88 at each end. 154 is a friction clutch to facilitate the starting and stopping of the machine without stopping the main drive. The rollers 2, 3, 4 and 5 are driven by chains 89 from the shaft 77, the said chains passing round a pulley 90 mounted on the shaft of the roller 3, the rotational movement of the roller 3 being transmitted to the roller 2 by gear wheels 48 and 49 mounted on the shafts 91, 92 of the rollers 3 and 2 respectively. The shafts of these rollers are supported in bearings of any suitable type and per se form no part of the present invention. The rollers 17, 18, 19 and 20 are driven from the shaft 77 by chains 93 passing over the pulley 87 and the pulley 94, the latter pulley being mounted on the shaft 95 of the rollers 18, 20. The rollers 17 and 19 are chain driven by means of the pulleys 50, 51, the pulley 51 being mounted on the shaft 96 carrying the rollers 17. 19. The rollers 2, 4 and 3, 5 as well as the rollers 17, 19 and 18, 20 may be driven by gearing instead of by chains. The sprocket wheel 84 drives the wheel 6 through the chain 7, the wheel 13 being rotated by a chain 14 which passes over the pulleys 22, 34, 32 and 33. The pulley 22 is flanged as at 97, 98 and these flanges are provided with spikes or inclined teeth or teeth of any other suitable form to assist in removal of the material between the wheel 13 and the chain 14 for delivery from the apparatus. 99 is a fan driven by chain 100 passing round the pulleys 101, 102, the latter pulley being mounted on the fan shaft 103 and the pulley 101 being mounted on the shaft 96 carrying the rollers 17, 19. The compression roller 28 is driven from the shaft 68 by sprocket wheels 104, 105 and chain 106, the sprocket 105 being mounted on a shaft 63 which is provided at its opposite end with a sprocket wheel 107, chain geared to a sprocket wheel 108 mounted on the shaft 109 of the roller 28. On the shaft 109 is mounted a gear wheel 110 which is adapted to engage a gear wheel 111 so as to drive the compression roller 27. On the shaft 55 is a pair of arms 112 carrying at their opposite ends the crushing or bruising roller 53. The arms 112 are formed as bell crank levers, the outer part 113 of which carries a weight 114.

The nozzle 10 is supplied with air under pressure from the fan 99 through the pipe 115 connected to a pipe 116 having a branch 117 coupled with the pipe 115. The pipe 115 is connected to the fan and is also connected to a pipe 118 which is branched as at 119, 120, the branches 119, 120 leading to the nozzles 23, 24 respectively. 121 is a shutter or other equivalent device by means of which the blast from the fan to the nozzle 10 can be regulated. 122 is a similar shutter by means of which the blast to the nozzles 23 and 24 can be regulated.

123 is a pipe through which water is supplied to the pipes 124, 125. From the pipe 124 a branch 126 is taken and led above the rollers 17, 19, 18 and 20 so that water can be delivered from the said pipe 126 through perforations 127 to and between the rollers 17, 18, 19 and 20. 128 is a branch pipe leading from the pipe 125, the said pipe having perforations 129 through which water is delivered to and between the rollers 2, 3 and 4, 5.

At the inlet end of the apparatus and mounted on the cross bars 130, 131 is a shaft 132 on which is mounted a roller 133. The periphery of this roller may be of a roughened nature or the periphery may be covered with rubber or may be formed with a projecting rib such as 133' or in any suitable manner so as to act on the material such as the leaf 52 to cause the butt ends of the leaves to come in alignment adjacent the inner edge of the upright 58 or against a board positioned and adjustable thereon. The shaft 132 is driven from a pulley 134' on the shaft 77 through a chain 134 which passes round a pulley 135 on the shaft 132.

The roller 133 constantly bears against the material and thus acts, whilst the apparatus is in operation, to force the butt ends into alignment as above explained.

136 is a wheel having spikes 137 or other suitable means whereby to assist in raising the part 151, that is to say, the horizontally projecting part of the material which is non-shredded and unscutched by the rollers 2, 3, 4 and 5 respectively into engagement between the chain 11 and the chain 14, that is to say, at the position where a change over is effected from the wheel 6 to the wheel 13.

The crushing roller 53 is driven from the shaft 68 by a sprocket wheel 138, chain 139, sprocket wheel 140 mounted on the shaft 67. The fluted or toothed wheel 54 on the shaft 67 drives or rotates the crushing or bruising roller 53.

Centrally of the lengths of the rollers 2, 4, 3, 5, 17, 19 and 18, 20 are disposed channels or troughs 141, 142, the floor beneath the apparatus being inclined as at 143, 144, 145, 146 towards these channels or troughs so that the pulp and impurities washed from between the rollers and likewise material cleaned from the rollers by the action of the water jets delivered thereto, flows into the said troughs 141. 142 and is thus readily and quickly removed from the apparatus, thereby preventing clogging or blocking of the apparatus by reason of the pulp and impurities etc. accumulating beneath the shredding and scutching rollers.

147 are belts which assist in removal of the material from the compression apparatus onto chains 148 which remove the material from the compression apparatus. 149, 150 are guard or safety bars placed below the wheels 13 and 6 respectively.

It is to be particularly noted that the juncture of the shredding rollers and of the scutching rollers is so disposed relative to the chain wheel 6 that the intensity of the shredding of the leaf 8 increases gradually from a minimum to a maximum while the following scutching action decreases gradually from a maximum to a minimum.

What I claim is:—

1. A method of decorticating fibrous material, which consists in crushing, shredding and scutching one part of the leaf while causing said leaf to travel in a predetermined path, thereafter diverting the leaf to cause it to move in a path parallel to the first mentioned path, and shredding and scutching the remaining part of the leaf while traveling in such second path.

2. A method of decorticating fibrous material, which consist in crushing a leaf near the butt, permitting part of the leaf and the butt to drop, shredding and scutching the said part and the butt, thereafter changing the path of movement of the leaf and gripping the scutched portion beyond the crushed portion in order to permit the remaining portion of the leaf to drop, shredding and scutching said remaining portion of the leaf, and thereafter causing the residual fibres to be straightened for discharging purposes.

3. A method of decorticating fibrous material such as sisal, hemp, jute, ramie, rhea, cocoanut fiber, esparto grass and other fibrous material including leaves and stalks, which consists in subjecting each leaf of the material to be treated to a shredding and scutching action alternately, the last scutching action being followed by the application of opposed streams of air under pressure, which streams of air acting in opposite directions on the ends of the fibres lay them approximately straight and horizontal for delivery from the apparatus.

4. A method of decorticating fibrous material such as sisal, hemp, jute, ramie, rhea, cocoanut fibre, esparto grass and other fibrous material including leaves and stalks, which consists in subjecting each leaf of the material to be treated to a shredding and scutching action, raising the shredded and scutched part of the leaf into an approximately horizontal position to be gripped so as to permit of shredding and scutching of the remainder of the leaf.

5. A method of decorticating fibrous material such as sisal, hemp, jute, ramie, rhea, cocoanut fibre, esparto grass and other fibrous material including leaves and stalks, which consists in subjecting one part of each leaf to a shredding action followed by a scutching action, raising the shredded and scutched part of the leaf into an approximately horizontal position to be gripped so as to permit of shredding and scutching of the remainder of the leaf, subsequently shredding the untreated part of the same leaf followed by a scutching action on the same part, the last scutching action being followed by the application of opposed streams of air under pressure, which streams of air acting in opposite directions on the ends of the fibres lay them approximately straight and horizontal for delivery from the apparatus.

6. A method of decorticating fibrous material such as sisal, hemp, jute, ramie, rhea, cocoanut fibre, esparto grass and other fibrous material including leaves and stalks, which consists in subjecting a part of the said material to a crushing action to permit of the said crushed part acting as a hinge, subsequently subjecting one part of the material to a shredding action, the said part being thereafter subjected to a scutching action, raising the already shredded and scutched part to the horizontal position by a blast of air, thereafter subjecting the remaining part of the material including the crushed part to a shredding action followed by a scutching action on the same part, the last scutching action being followed by the application of opposed streams of air under pressure, which streams of air acting in opposite directions on the ends of the fibres lay them approximately straight and horizontal for delivery from the apparatus.

7. Apparatus for use in decorticating fibrous material such as sisal, hemp, jute, ramie, rhea, cocoanut fibre, esparto grass and other fibrous material including leaves and stalks comprising a pair of oppositely rotating rollers adapted to shred one part of each leaf, a pair of oppositely disposed rollers aligned with the shredding pair of rollers and adapted to effect scutching of the shredded part of the leaf, shredding and scutching taking place alternately and the fibres of the shredded and scrutched material being subsequently subjected to pressure air currents from oppositely disposed nozzles so as to lay the fibres in an approximately straight, flat position for discharge from the apparatus.

8. Apparatus for use in decorticating fibrous material such as sisal, hemp, jute, ramie, rhea, cocoanut fibre, esparto grass and other fibrous material including leaves and stalks, wherein the material to be treated is delivered to and beneath a crushing roller to allow of one end of the material dropping, means to convey the dropped end into engagement with and between shredding rollers, the residual fibres being subsequently acted on between a pair of oppositely rotating scutching rollers having their axes aligned with the shredding rollers, the shredded and scutched ends being thereafter acted on by a blast of air so as to raise the said ends to an approximately horizontal position in which position the said ends are engaged between moving chains, the non-shredded and unscutched ends dropping into position to be acted on by a second pair of oppositely rotating shredding rollers, the shredded ends being thereafter engaged between a second pair of oppositely rotating scutching rollers, the opposite ends of the residual fibres of the material thus shredded and scutched being thereafter raised into an approximately horizontal position for discharge from the apparatus.

9. Apparatus in accordance with claim 1, wherein a nozzle is disposed in a suitable position between the first pair of scutching rollers and the second pair of shredding rollers so that a blast of air from the said nozzle is caused to raise the residual fibres of the shredded and scutched material into an approximately horizontal position prior to conveyance of the said material to a second shredding set of rollers.

10. Apparatus in accordance with claim 8, wherein a guiding device such as a spiked wheel is disposed in a plane at right angles to the length of the leaf and between the first scutching rollers and the second shredding rollers so as to raise and guide the untreated part of the leaf into an approximately horizontal position when changing over, to the second set of shredding and scutching rollers.

11. Apparatus in accordance with claim 8, wherein nozzles are disposed adjacent the discharge end of the apparatus, the said nozzles having their outlets pointing in opposite directions and positioned to act on opposite ends of the residual fibres of the shredded and scutched material thereby to lay the said fibres in an approximately horizontal position for discharge from the apparatus.

12. Apparatus in accordance with claim 8, wherein each group of rollers is provided with two sets of teeth one set being adapted to effect a shredding action and the other set being adapted to effect a scutching action.

13. Apparatus in accordance with claim 7, wherein individual leaves of the material prior to its delivery to and beneath a crushing and bruising roller is acted on by means whereby the butt ends of the said leaves are caused to come into approximate alignment.

14. Apparatus in accordance with claim 7, comprising in combination an endless band adapted to feed the leaves to the apparatus, superimposed rollers disposed adjacent the end of the said band, the said rollers being so formed as to exert a crushing action on each leaf as the latter is fed from the endless band to and between the crushing rollers.

15. Apparatus in accordance with claim 1, wherein the floor below the apparatus inclines from opposite ends of the shredding and scutching rollers to a position centrally thereof so as to allow of removal of the pulp from the apparatus through channels disposed centrally of the length of the shredding and scutching rollers and transversely thereof.

16. Apparatus in accordance with claim 8, wherein the surface of each scutching roller is provided with teeth, the exit half of the surface preferably having double the number of teeth on the inlet half of the surface, the teeth on both halves being arranged longitudinally of the roller.

17. Apparatus in accordance with claim 8, wherein the surface of one or more than one shredding roller is divided into two parts, the part which initially acts on the fibres having double the number of longitudinally arranged rows of teeth as compared to the surface of the other part.

18. Apparatus in accordance with claim 8, wherein the shredding rollers are provided with longitudinally arranged rows of teeth, the said teeth being preferably in the form of conical pyramidal, polygonal or other suitably pointed projections.

19. Apparatus in accordance with claim 7, wherein the scutching rollers are provided with longitudinally arranged rows of ribs each rib extending practically from one end of the scutching portion of the roller to the other end.

20. Apparatus in accordance with claim 7, wherein the opposed rollers of the scutching pair of rollers have their longitudinally arranged ribs staggered so as to subject the fibres to a beating action when engaged between the scutching rollers.

21. Apparatus in accordance with claim 7, wherein the opposed rollers of the shredding pair of rollers have their longitudinally arranged teeth staggered so as to subject the fibres to a beating action when engaged between the shredding rollers.

22. A method according to claim 1, wherein the slitting action on each leaf gradually increases from a minimum to a maximum, the subsequent scutching action decreasing from a maximum to a minimum.

23. Apparatus for use in decorticating fibrous material such as sisal, hemp, jute, ramie, rhea, cocoanut fibre, esparto grass and other fibrous material including leaves and stalks, comprising in combination two pairs of rollers mounted on shafts displaced apart laterally and mounted horizontally at the same level, a carrying wheel adapted to co-operate with a carrying chain being disposed centrally between the oppositely disposed pairs of rollers each pair of rollers comprising slitting members and scutching members the axis of the carrying wheel being disposed cross-wise of the slitting and scutching rollers and centrally between the slitting and scutching portions of the next pair of rollers.

24. Apparatus for use in decorticating fibrous material, comprising a pair of oppositely positioned rotatable rollers adapted to slit one part of each leaf of fibrous material, a pair of oppositely disposed rollers aligned with the shredding pair of rollers, and adapted to effect scutching of the shredded part of the leaf, means to carry the leaf between the rollers to permit of the latter operating thereon, the two pairs of rollers being so positioned that the intensity of the shredding action gradually increases from a minimum to a maximum intensity, the following scutching action being initiated as a maximum and decreasing to a minimum.

In testimony whereof I have hereunto signed my name.

JOHN COOK.